United States Patent [19]

Whitehouse

[11] 3,766,496

[45] Oct. 16, 1973

[54] FEEDBACK-TYPE ACOUSTIC SURFACE WAVE DEVICE

[75] Inventor: Harper John Whitehouse, San Diego, Calif.

[73] Assignee: The United States of America as represented by the Secretary of the Navy, Washington, D.C.

[22] Filed: Feb. 4, 1971

[21] Appl. No.: 112,603

Related U.S. Application Data

[63] Continuation-in-part of Ser. No. 793,148, Jan. 22, 1969, abandoned.

[52] U.S. Cl. ............... 331/107 A, 310/9.8, 330/5.5, 331/132, 331/135, 331/155, 333/30 R, 333/72

[51] Int. Cl. ....... H03b 5/36, H03b 7/14, H03h 9/20

[58] Field of Search ............... 331/107 A, 155, 135, 331/132; 333/30 R, 72; 330/5.5; 310/9.7, 9.8; 307/308

[56] References Cited

UNITED STATES PATENTS

| | | | |
|---|---|---|---|
| 3,568,102 | 3/1971 | Tseng | 333/30 |
| 3,376,572 | 4/1968 | Mayo | 333/72 X |
| 3,551,837 | 12/1970 | Speiser et al. | 333/30 |
| 3,582,840 | 6/1971 | DeVries | 333/72 |
| 3,582,838 | 6/1971 | DeVries | 333/72 |
| 3,582,540 | 6/1971 | Adler et al. | 331/107 A X |
| 3,446,975 | 5/1969 | Adler et al. | 333/72 X |

OTHER PUBLICATIONS

Gottlieb, "Basic Oscillators", John F. Rider Publisher, N.Y. 1963 pp. 86–87.

*Primary Examiner*—Roy Lake
*Assistant Examiner*—Siegfried H. Grimm
*Attorney*—Richard S. Sciascia, Ervin F. Johnston and John Stan

[57] ABSTRACT

A distributed-transducer surface wave device, comprising a crystal substrate, capable of propagating a surface wave, and a pair of transducers disposed in an aligned relationship upon the crystal substrate, including an input and output transducer, each of which includes at least one pair of interdigitated electrodes disposed perpendicularly to the direction of surface wave propagation caused by the application of an input signal to the input transducer. The distance between each pair of adjacent electrodes for each of the transducers is uniform. A feedback loop is connected from the output of the output transducer to the input of the input transducer.

19 Claims, 5 Drawing Figures

PATENTED OCT 16 1973 3,766,496

SHEET 1 OF 3

FEEDBACK-TYPE ACOUSTIC SURFACE WAVE DEVICE

CROSS-REFERENCE TO A RELATED APPLICATION

This invention is a continuation-in-part of the application having the Ser. No. 793,148, entitled "Acoustic Wave Device," and filed on Jan. 22, 1969, by the same inventor, and now abandoned.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The general purpose of this invention is to provide a distributed-transducer surface wave device which can be implemented as a feedback circuit, which embraces most of the advantages of similarly employed prior art feedback circuits and possesses none of the disadvantages of the prior art embodiments. To achieve this purpose, the present invention contemplates a unique acoustic wave device comprising at least one set, a set usually comprising a pair of transducers, an input transducer, sometimes termed a launch or transmitter transducer, and an output transducer, sometimes termed a receive or detector transducer, each transducer comprising an electrode structure comprising interdigitated electrodes disposed upon a crystal used as a substrate, with the interdigitations being either coded or uncoded. Adjacent interdigitations represent a 0 or a 1, depending upon the order of their arrangement in the direction of surface wave propagation.

The mode of operation of the device is basically twofold: to provide a surface wave delay line where the input and output transducers are separated to the limit of the width of the substrate and so coded as to provide high bandwidth. Or, alternatively, to operate as a signal processing filter if the transducers are in juxtaposition and are tapped contiguously along the entire length of the propagation path.

The amplitude of the wave propagating along the surface of the substrate is not modulated. However, positional modulation of the wave may be achieved by changing the dimensions of the interdigitated electrodes spacially on the surface of the substrate.

When coded, the input and output transducers are preferably encoded similarly, in accordance with optimum detection characteristics according to statistical detection theory. The interdigitated electrodes of the input and output transducers are mounted on the surface of the substrate with their individual electrode strips arranged parallel to each other. The distance separating the leading edges, or any other two corresponding electrodes, of the input and output transducers forming a transducer pair provides the delay for the acoustic signal. This acoustic signal propagates as a surface wave along the crystal, as distinct from the volume waves of prior art crystal delay lines.

The distributed acoustic wave device of this invention has many advantages over similar devices used in the prior art.

The acoustic wave device is convenient to mount and attach to some other structure for support. The crystals, being thin, may be conveniently packaged. The device may be simply bonded to another surface using the face of the crystal opposite the one upon which the electrodes are disposed. The interdigitated, photo-etched electrodes are fabricated with ease in dimension control, this of course being the usual advantage of use of a photo-etching process.

The basic construction of the acoustic wave device lends itself to integrated circuit construction techniques. For example, electric return paths may be made of aluminum, copper, or some other conductor deposited on the active surface of the crystal substrate. Any type of electric conductive path arrangement may be either photo-etched, starting with copper-clad material, or deposited on the active surface, or even on the opposite, inactive surface. Chip-type semiconductor amplifiers may be directly bonded to one surface of the crystal used as a substrate. Other data processing components, such as clocks, time compressors, and correlators may be fabricated on one of the surfaces of the same crystal used as a substrate.

Temperature stability of the acoustic wave device is achieved by proper crystal choice and proper cut or orientation, while differential temperature stability is achieved between a plurality of acoustic wave devices by the common crystal substrate on which the surface waves travel, making temperature control or temperature stabilization of the environment often not needed for the total integrated circuit.

Interchannel separation is an important feature provided by this invention. Interchannel interference on a surface wave piezoelectric crystal device may be controlled by a directivity pattern or by a code choice, e.g., uncorrelated codes for different channels. Thus the directivity of the transducer, and the discrimination afforded by the electrodes coated on the surface allow more than one delay line, or other surface wave device, to be mounted to the same active crystal surface.

Since surface waves can follow gentle curves, the crystal structure may be configured to fit surfaces other than planar mounting surfaces.

The acoustic wave devices of this invention are up to 100 times smaller than the torsional delay line implementations of the prior art, used for the same purposes. Also, they are up to 100 times faster (data processing speed), since a single crystal rather than a polycrystaline delay medium is used.

SUMMARY OF THE INVENTION

This invention relates to distributed-transducer surface wave device, comprising a crystal substrate, capable of propagating a surface wave, and a set, generally comprising a pair, of transducers disposed in an aligned relationship upon the crystal substrate. A set of transducers includes an input and output transducer, each of which includes at least one pair of interdigitated electrodes disposed perpendicularly to the direction of surface wave propagation caused by the application of an input electrical signal to the input transducer. A feedback loop is connected from the output of the output transducer to the input of the input transducer, the manner of connection providing either positive or negative feedback. Generally, at least one amplifier is included and the feedback connection provides positive feedback, which induces oscillations, which may be a source of clock pulses for other acoustic wave devices, particularly those which are disposed upon the same substrate.

STATEMENT OF THE OBJECTS OF THE INVENTION

An object of the present invention is the provision of an acoustic wave device, including a feedback type, which is not limited to only one channel per crystal body, i.e., the surface wave device provides interchannel separation.

Another object is to provide an acoustic wave device not requiring elaborate temperature control or temperature compensation.

A further object of the invention is the provision of an acoustic wave device which is amenable to integrated construction, such as by the use of a single crystal as a common substrate.

Still another object is to provide an acoustic wave device which is easy to support or mount to another structure, and also which is easy to fabricate, and may have other components mounted on it.

Other objects and many of the attendant advantages of this invention will be readily appreciated as the same becomes better understood by reference to the following detailed description, when considered in connection with the accompanying drawings, in which like reference numerals designate like parts throughout the figure thereof and wherein:

DESCRIPTION OF THE PREFERRED EMBODIMENTS

A key feature of the invention is that two or more delay lines, feedback-type acoustic wave devices, or other types of processors may be mounted upon a common substrate, and the mode of operation of any one of the delay lines or processors may be independent of the mode of operation of any other delay line or processor. If the acoustic wave device contains only two processors, for example two delay lines, the signal traversing the surface of one of them may be considered to traverse an upper channel of the acoustic wave device, while a second signal may be said to traverse a lower channel.

Figure 1:
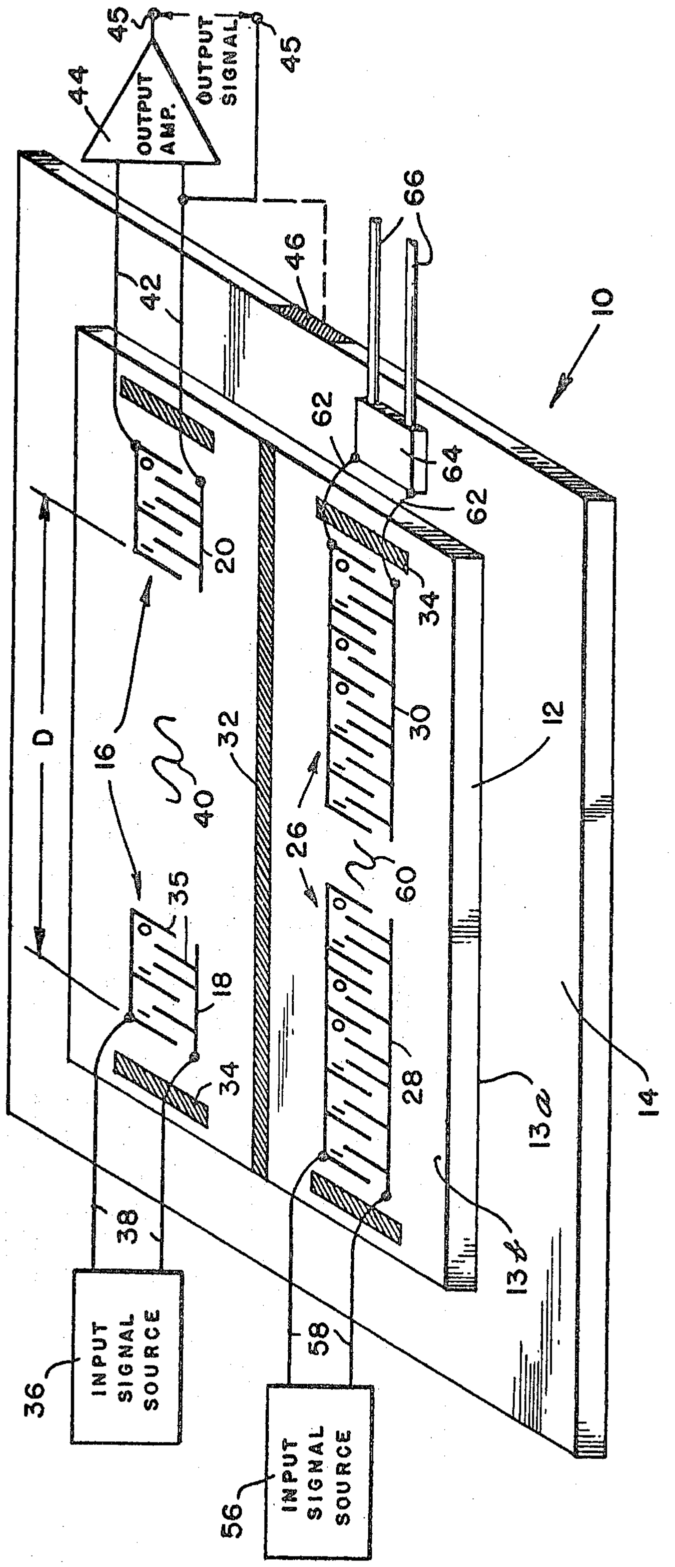
FIG. 1 is a view, partly diagrammatic and partly in block form, of one embodiment of an acoustic wave device showing two transducer channels, each including a pair of coded transducers. The specific embodiment shown herein does not have a feedback loop, but is exemplary of the construction and operation of a coded acoustic surface wave device.

Referring now to FIG. 1, acoustic wave device 10 comprises a crystal substrate 12 which is mounted or deposited or otherwise disposed upon a base 14. The crystal substrate 12 comprises a bottom acoustically inactive, surface 13*a* which may be attached to the base 14, and an acoustically active upper surface 13*b* upon which the active elements of the acoustic wave device 10 are disposed.

Disposed upon the upper surface 13*b* of the crystal substrate 12 is an upper channel transducer pair 16, consisting of an upper channel input transducer 18 aligned in the direction of wave propagation with an upper channel output transducer 20. Also disposed upon the crystal substrate 12 is a lower channel transducer pair 26, consisting of a lower channel input transducer 28 aligned with a lower channel output transducer 30. It should be pointed out that more than two transducers may be aligned in any one channel. Separating the upper channel transducer pair 16 from the lower channel transducer pair 26 is an isolator and divider strip 32. Also, at each end of the transducer pairs 16 and 26 are absorber stripes 34. Each of the four transducers include an electrode structure including interdigitated electrodes 35, which comprise the active elements.

A periodic structure including interdigitated electrodes 35, as shown in FIG. 1, corresponds to a high Q electrical tank circuit, as the term "tank" is commonly used in electronics.

The mode of operation of the acoustic wave device 10 is as follows:

An electrical signal generated by input signal source 36, sometimes termed a launch amplifier, is transmitted over leads 38 and impressed upon the interdigitated electrodes 35 of upper channel input transducer 18.

The input electrical signal generated by input signal source 36 may be either rectangular or pulses of some other shape. The mode of coding of the interdigitations 35 is shown by the 1's and 0's at the top part of the electrode structure 35 of the upper channel transducer 16 and the lower channel transducer 26.

If the transducer pairs 16 and 26 are to be used for coding, the interdigitations of the electrode structure are not uniformly alternate, i.e., a Barker code. However, in the usual case, whether coded or uncoded, the interdigitations of the output transducer 20 or 30 are identical to those of the respective input transducer 18 or 28, as is shown in FIG. 1.

The interdigitations of electrodes 35 in transducer 20 are configured to give maximum processing gain for the Barker coded signal generated by the input transducer 18. The coding results in a processing gain in the sense that there is coherent addition or superposition of the signals from each of the individual strips of the electrodes 35 simultaneously.

The electrical signal is transduced by the upper channel input transducer 18 into an upper channel acoustic surface wave, designated by reference symbol 40 in the figure, which traverses the upper half of the top surface 13b of the crystal substrate 12. Isolator divider strip 32 serves to prevent upper channel acoustic surface wave 40 traversing the upper channel of crystal substrate 12 from having any effect on surface waves traversing any other channels of the surface wave device 10 which are located below it.

The acoustic surface wave 40 traversing the upper half of top surface 13*b* is, in turn, transduced by upper channel output transducer 20 into an electrical signal, which traverses leads 42 connected to upper channel output amplifier 44, which produces an output signal at output terminals 45.

Absorber stripes 34 at each end of the upper channel transducer pair 16 serve to prevent the acoustic surface wave 40 from traversing the upper channel, on top surface 13*b* of crystal substrate 12, more than once, that is, they prevent reflections of the acoustic surface wave.

Isolator divider strip 32 and the absorber stripes 34 may be of grease or other lossy material.

If it be desired that the system be grounded, a ground plane 46, attached to the base 14 may be provided.

In the remaining figures other than FIG. 1, the isolator divider strip 32 is not required and the absorber stripes 34 have been omitted in order not to unnecessarily clutter up the drawings. It must be assumed that, in an actual practical embodiment, they would be present if reflections are to be avoided or if interference between any two parallel channels is to be avoided.

The delay time of the acoustic wave device 10 is a function of the distance D, FIG. 1, between any interdigitation of the electrode of upper channel input transducer 18, and the corresponding interdigitation of the electrode of upper channel output transducer 20 and the acoustic velocity of the surface wave 40, while the velocity of the surface wave depends upon the orientation and material of the crystal material 12.

In the specific embodiment shown in FIG. 1, the input signal source 36 may either produce a repetitive uncoded signal or a coded signal of some type, such as an error correcting code, error detecting or bandwidth-conserving.

The advantage in having coded signal, such as a Barker coded signal, from the input transducer 18 rather than a non-Barker coded transducer is the following: If the output transducer 20 is Barker-coded and the upper channel transducer pair 16 is used as a recirculating delay line, then this Barker code would be recirculated to the input leads 38, as a pulse would be produced each time that the two codes would be coincident.

A key feature of the acoustic wave device 10 of this invention is that more than one additional processor can be used on the same crystal substrate 12 independently of the first processor, upper channel transducer pair 16. Only one additional delay line is shown in FIG. 1, making a total of two. A lower channel input signal source 56 generates pulses which may be a coded electrical signal, more specifically, an error-correcting, error-detecting or bandwidth-conserving signal, which is conducted over leads 58 to the lower channel input transducer 28. For this channel also, the electrode configuration of this transducer 28 may match the coding of the output transducer 30. Acoustic surface wave 60 traverses the distance between the lower channel input transducer 28 and the lower channel output transducer 30 and is transduced by the latter into an electrical signal which is conducted by leads 62 into a chip amplifier 64. Conductor strips 66 connect to the chip amplifier 64, and are output leads of the chip amplifier for connection to external circuitry. (Leads for power and ground are not shown for clarity of presentation.)

Figure 2:
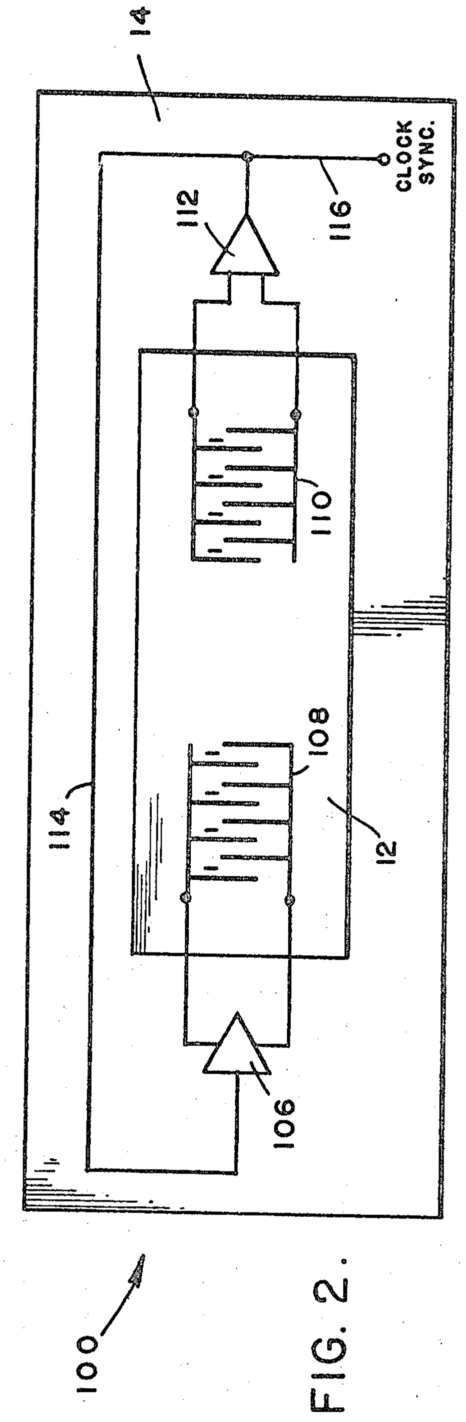
FIG. 2 is a similar type of view showing an uncoded transducer pair connected in a manner so as to provide feedback, positive or negative, from the output transducer to the input transducer.

FIG. 2 shows an acoustic wave device implemented in the form of a continuous wave oscillator 100, which may also be used to generate clock pulses. An amplifier 106 has its output connected to an input transducer 108 having uniformly coded, that is, uncoded, interdigitated electrodes, as shown by the four 1's in the figure. An uncoded output transducer 110 has its output leads connected to an output amplifier 112. A feedback loop 114 connected from the output amplifier 112 into the input amplifier 106 forms a necessary feedback element for oscillator action. Clock sync pulses, suitable for clocking processing circuits, may be derived by means of output lead 116.

As the embodiment is shown in FIG. 2, this oscillator 100 may be implemented upon, or form, one of the channels on the substrate 12. The frequency of oscillation then becomes a function of the temperature of the substrate 12. Any other channels comprising other processors disposed upon the same substrate 12 become electronically compensated with respect to frequency.

As may be seen in FIG. 2, the interdigitations of the electrodes of both the input transducer 108 and the output transducer 110 are alternate, that is, uncoded, in that the interdigitations show uniform alternations with respect to a pair of electrodes forming either an input transducer or an output transducer. The alternate interdigitations correspond to an encoding pattern of, in the embodiment shown, of 1, 1, 1, and 1 for both the input and output transducers 108 and 110. This results in a narrow band filter effect which is necessary in order to achieve high-frequency stability. An uncoded oscillator generates oscillations which are sinusoidal, while a coded oscillator generates a train of pulses.

A clock oscillator 100 featuring a 50—50 percent distribution of the input, or launch, and output, or receiver, transducer electrode elements results in an oscillator having a very high Q. Such a construction for the clock oscillator 100 is equivalent to using integral transmission line tank circuits of many wave length equivalents, that is, a high Q circuit.

In order that a pair of transducers 108 and 110 form an oscillator 100, it is not necessary that both the input transducer and the output transducer have the same number of interdigitations. However, as indicated above, a greater selectivity is obtained when the interdigitations are numerically equal.

Still referring to FIG. 2, the implementation shown in this figure, with the feedback loop 114 providing a voltage of the proper magnitude and phase, can be used as a negative feedback amplifier. In both the continuous wave oscillator 100 embodiment and negative feedback embodiment, preferably both the input transducer 108 and the output transducer 110 would have the same number of interdigitations for the electrode structure, although not necessarily.

Figures 3, 4:
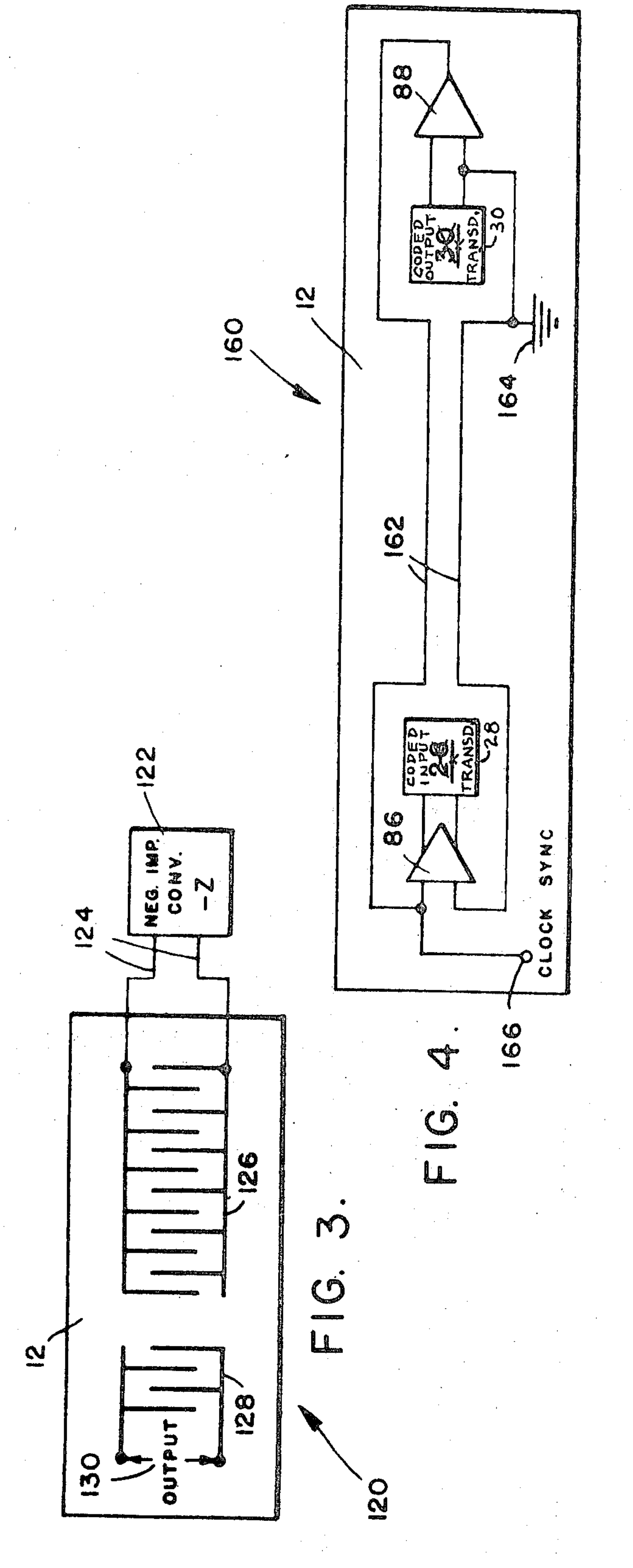
FIG. 3 is a view, partly diagrammatic and partly in block form, showing an embodiment of a negative-resistance oscillator requiring only one transducer, the left transducer being an optional pick-off transducer.
FIG. 4 is a schematic diagram of an acoustic wave device of a combination of acoustic and electrical feedback.

As is shown in FIG. 3, another type of oscillator, a self-excited clock oscillator 120, may be devised by means of a negative resistance termination with acoustic coupling to a tank circuit. In the alternative clock or oscillator 120 shown herein, the feedback takes place due to the negative feedback converter 122, connected by leads 124 to the output of transducer 126, which makes the system self-oscillatory. This is in contrast to the continuous wave oscillator 100 shown in FIG. 2, where there is a feedback loop 114 from the output circuit 112 back into the input circuit 108. To implement a self-excited clock oscillator 120, a single transducer is used with the signal being reflected from the boundary of the crystal substrate 12, or from an impedance discontinuity in the acoustic path of the signal.

Across the transducer is placed a negative resistance amplifier, or negative feedback converter 122, such as those used with negative-resistance repeaters. This represents a one-terminal oscillator. A tunnel diode may be used as a negative resistance amplifier, when operating on the negative resistance portion of its characteristics. Transducer 128 serves as an acoustic probe coupled to the oscillating tank circuit 126, and is not required to cause the generation of oscillations.

The acoustic coupling to the tank circuit, the tank circuit consisting of the negative impedance converter 122 and transducer 126, is provided by the acoustically coupled transducer 128 and its output terminal 130, even though it is physically and electrically isolated from the oscillator by being located only in the propagation path and is not electrically connected to transducer 126. The coupling is not to the negative Z termination 122, the tank circuit being connected to the negative Z termination 122. The negative Z termination 122 in general contains reactive components, but when it does not, it becomes a negative resistance termination.

To implement a self-excited clock, a single transducer may be used, as is shown in the embodiment 120 of FIG. 3. However, with only a single transducer, the output is taken from the electrical terminal, that is, from a negative impedance device 122. If, however, it is desired to take energy from the acoustic wave, a separate transducer 128 must be used, electrically separated but coupled acoustically in the propagation path.

A negative impedance termination is necessary in order that the self-excited clock oscillator 120 oscillate. Because any actual oscillator has real losses and cannot oscillate indefinitely unless these losses are compensated for, a tunnel diode or some other type of negative impedance device must be used in order that the system continue oscillating.

FIG. 4 is a schematic illustration of a combination acoustic and electrical feedback, herein termed an electro-acoustic processor 160. FIG. 4 is similar to FIG. 2, with the feedback loop 114 of FIG. 2 replaced by a metallization strip 162 of FIG. 4, consisting of two conductors, one of which is grounded at 164. One difference between FIGS. 2 and 4 is that, in FIG. 2, transducers 108 and 110 are uncoded, whereas the transducers 28 and 30 of FIG. 4 are coded. Coded transducers cause pulse-type oscillations, whereas uncoded transducers cause sinusoidal oscillations.

Acoustically, the transducer 30 is responsive to transducer 28. Both transducers 28 and 30 are shown in simple block form in this figure. Input amplifier 86 and output amplifier 88 are used for amplifying the electrical signal. If the processor 160 be used as a negative-feedback amplifier, neither amplifier, 86 nor 88, is required. If the processor be used as a positive feedback amplifier, then neither amplifier is required for a small amount of feedback, but at least one amplifier, 86 or 88, is required to provide enough positive feedback to cause the generation of oscillations.

Metalization has been applied to the external portion of the acoustic propagation path in such a manner that the metalization 162 supplies two functions: (1) on a substrate 12 which has a low velocity of acoustic propagation relative to the velocity of propagation in the metalization strip, i.e., aluminum on glass, the metalization strip 162 forms an acoustic wave guide confining the propagation from the transducer to only that region within the middle of the metalization strip while, simultaneously, at high frequencies, the two conductors of the acoustic wave are likewise to be considered conductors of an electrical signal along a parallel-line transmission line, so that the electrical response of the acoustic wave from the output of the amplifier 88 is passed by means of the metalization strip 162 back into the input amplifier 86, the metalization strip thus forming a recirculation loop, in such a manner that transmission line losses do not occur.

This type of structure is equivalent to a system such as a balanced strip line for the electrical transmission, combined with an acoustic wave guide for the acoustic transmission, and using parts which are ultimately required for the operation of the device, thereby getting additional benefits from parts which were required in any case. The structure disclosed in this FIG. 4 is actually, more precisely, similar to a differential strip line, this implying the presence of a ground plane, either one side being grounded and with another line operating against the implied ground, or there is an implied ground elsewhere in the system and both lines are operating adjacent to the ground plane.

Still referring to FIG. 4, neither lead of the metallization strip 162 need be grounded if input amplifier 86 and output amplifier 88 are balanced amplifiers. In such a case, a neutral point such as a center tap, in both amplifiers 86 and 88 would be selected for grounding. Under these conditions, transducers 28 and 30 would preferably be differential transducers.

More generally, in regard to the figures, with respect to common bus lines, whether in connection with a ground line or a power supply line, the latter particularly is not shown in the drawings, it being assumed that a person skilled in the art would know how to connect them.

Figure 5:
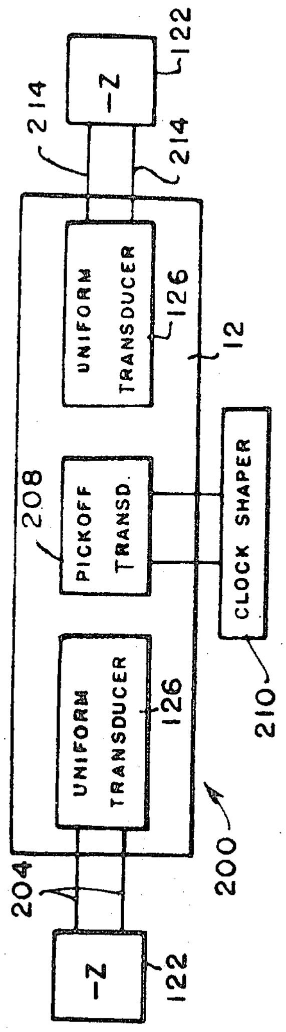
FIG. 5 is a schematic diagram showing two of the negative-impedance oscillators of FIG. 3 symmetrically disposed upon a single substrate, as well as a third, pick-off, transducer in the same signal propagation channel.

FIG. 5 shows a refined embodiment of the self-oscillating circuit shown in FIG. 3, but using two negative impedance converters 122, similar in function to the one shown in FIG. 3. It is a two-transducer oscillator circuit, both uniformly coded transducers labeled transducer 126. In this type of two-part device, there is no dependence on reflected waves from the boundaries of the substrate 12, as was the case with the self-excited clock oscillator 120 shown in FIG. 4. In both oscillators 120 and 200, oscillations are self-sustaining because of the frequency-selective transducers 126 and the negative impedance converters 122, which provide the power gain in the circuit to make up for the losses which are present in the circuit, particularly the acoustic terminations in the form of absorber stripes 34, not shown for clarity.

An auxiliary acoustic pickoff transducer 208 picks off or taps a signal by acoustic coupling in the acoustic propagation path to the tank circuits, which uniform transducers 126 represent. The pickoff transducer 208 may be considered to have the same function as transducer 128 of FIG. 4, or, alternatively, FIG. 5 may be considered to consist of two self-excited oscillators 120 symmetrically aligned with respect to each other, and with respect to pickoff transducer 208.

The output signal from pickoff transducer 208 may then be passed to a clock shaper 210, if it be desired to produce the clock timing pulses which may be required in the embodiments of other acoustic wave processors which may be disposed on the same substrate 12.

The clock shaper 210 is an electronic device, more specifically, a logic circuit, and connected to the pick-off transducer 208, which taps the acoustic signal which propagates in both directions on the substrate 12, from left to right and right to left, between the two uniform transducers 126. The function of the clock shaper 210 is to transform the sine wave signal picked off by pickoff transducer 208 and shape it into a rectangular waveform or other timing waveform. The pickoff transducer 208 is coupled lightly, that is loosely, to the oscillating signal and, as a consequence, any digital circuits which may be connected to the output terminal do not reflect back time-varying loads on the oscillator to interfere with the frequency stability of the oscillator.

With respect to alternative embodiments for the substrate to be used with the acoustic wave devices, other materials besides quartz which may be used are: (a) any other piezoelectric material; and (b) single-crystal ferroelectric materials.

In general, one uses a substrate whose temperature coefficient is chosen to be equal and opposite to the change in the velocity of propagation, say in parts per million, and then chooses a film for additional electrical characteristics, the film being thin enough so that it does not appreciably affect the acoustical characteristics, with respect to surface wave propagation, of the substrate, except as described in connection with the discussion of FIG. 4.

A polycrystaline piezoelectric or ferroelectric film may be used on any substrate which has, in principle, the same velocity of wave propagation as the velocity of wave propagation of the film. Similar velocities are necessary in order to not have acoustic dispersion.

The spectral response of the transducers herein described may be varied in one of two alternative ways:

Alternative 1: A constant-width transducer, where the width of the transducer is measured in a direction perpendicular to the direction of wave propagation, may have its spectral response changed, in the frequency domain, by changing the width of the individual electrode stripes.

Alternative 2: The spectral shape of the transducer in the frequency domain may be changed by changing the physical width of the overall transducer on the substrate.

While they both accomplish the same results of spectral weighting of the frequency of the signal, the two different types of shading have different effects on the directivity pattern.

In the first alternative, where the physical overall width or lateral displacement of the whole transducer remains fixed, and only the width of the interdigitations vary, the directivity pattern of the transducer remains more or less fixed.

Conversely, in the second alternative, where the actual lateral width of the whole transducer changes, the directivity, which becomes the Fourier transform of the aperture of the transducer in its physical realization, has thus been changed by the lateral change and its directivity has changed. Combining variations of the individual interdigitations with width variation of the entire transducer, there are available two degrees of freedom, which allows one to achieve spectral shadings simultaneously with directivity control.

Obviously many modifications and variations of the present invention are possible in the light of the above teachings. It is therefore to be understood that, within the scope of the appended claims, the invention may be practiced otherwise than as specifically described.

What is claimed is:

1. A distributed-transducer acoustic wave device comprising:

a crystal substrate capable of propagating a surface wave;

at least one transducer set disposed upon the crystal substrate, each transducer set including at least an input transducer adapted to receive an input electrical signal and an output transducer, each input and output transducer including at least a pair of interdigitated electrodes which, upon application of a signal to the input transducer, cause acoustic wave propagation on the surface of the crystal substrate, the electrodes of each transducer of each transducer set being aligned perpendicular to the direction of wave propagation; and a feedback loop connected from the output of the output transducer to the input of the input transducer, for feeding back to the input a voltage having a predetermined magnitude and phase with respect to the input electrical signal; and wherein the interdigitations of the electrodes of at least one of the transducers of at least one of the transducer sets are coded.

2. The acoustic wave device as recited in claim 1, wherein the feedback connection is such as to provide positive feedback from the output to the input.

3. The acoustic wave device according to claim 1, wherein the feedback connection is such as to provide negative feedback from the output to the input.

4. The acoustic wave device as recited in claim 1, wherein the substrate consists of a piezoelectric crystal.

5. The acoustic wave device as recited in claim 4, wherein the piezoelectric crystal is quartz.

6. The acoustic wave device as recited in claim 1, wherein the code is a Barker code.

7. The acoustic wave device as recited in claim 1, further comprising:

at least one other transducer set disposed upon the crystal substrate, the electrodes of the transducer sets being disposed upon the crystal substrate in a parallel relationship, each transducer set forming an acoustic processing circuit.

8. The acoustic wave device as recited in claim 7, further comprising:

an isolator divider strip disposed upon the substrate between each transducer set; and an absorber stripe disposed upon the substrate at each end of a transducer set.

9. The acoustic wave device as recited in claim 1, further comprising:

an input amplifier connected to the input transducer for impressing an amplified input electrical signal upon the electrodes of the input transducer, the electrical signal being transduced to an acoustic surface wave traversing the surface of the substrate in a direction toward the output transducer.

10. The acoustic wave device as recited in claim 9, wherein the feedback connection is such that the voltage fed back from the output to the input has a magnitude and phase such that the acoustic wave device generates oscillations.

11. The acoustic wave device as recited in claim 9, further comprising:

an output amplifier connected to the output transducer for amplifying the electrical signal transduced by the electrodes of the output transducer.

12. The acoustic wave device as recited in claim 11, wherein the feedback connection is such that the voltage fed back from the output to the input has a magnitude and phase such that the acoustic wave device generates oscillations.

13. The acoustic wave device as recited in claim 12, further comprising:

at least one other transducer set disposed upon the crystal substrate, the electrodes of the transducer sets being disposed upon the crystal substrate in a parallel relationship, each transducer set forming an acoustic processing circuit.

14. The acoustic wave device according to claim 13, serving as a clock source, for clocking the propagation of pulses of the other acoustic processing circuits disposed on the same substrate.

15. The acoustic wave device as recited in claim 1, wherein the feedback loop comprises a two-conductor metalization strip disposed upon the same substrate.

16. A distributed-transducer acoustic wave device comprising:

a crystal substrate capable of propagating a surface wave;

a transducer disposed upon the crystal substrate, adapted to receive an input electrical signal, and including at least a pair of interdigitated electrodes which, upon application of a signal, cause acoustic wave propagation on the surface of the crystal substrate, the electrodes of the transducer being aligned perpendicular to the direction of wave propagation; and a negative impedance converter connected to the transducer, for generating oscillations in the electrodes.

17. The acoustic wave device according to claim 16, further comprising:

another, second, transducer, disposed upon the same substrate, aligned with the first-named transducer in the same direction of wave propagation, capable of detecting the oscillations generated by the negative impedance converter.

18. The acoustic wave device according to claim 17, further comprising:

a third transducer, substantially identical to the first-named transducer, and aligned with the other two transducers in the same direction of wave propagation, the second transducer being disposed between the other two; and a negative impedance converter connected to the third transducer.

19. The acoustic wave device according to claim 17, further comprising:

a clock shaping circuit, connected to the second transducer, for shaping the signals detected by the second transducer.

* * * * *